2,719,969
Patented Oct. 4, 1955

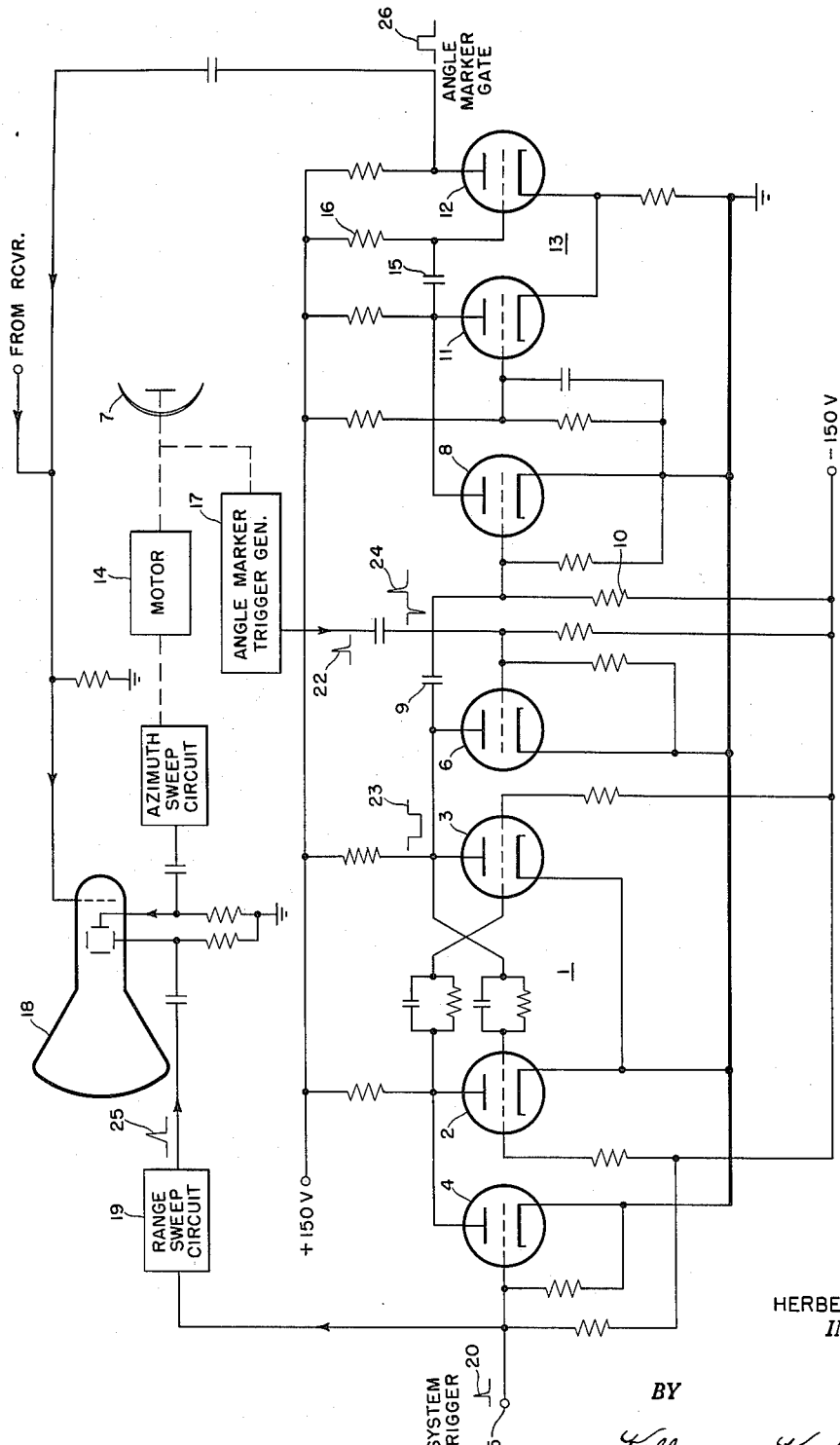

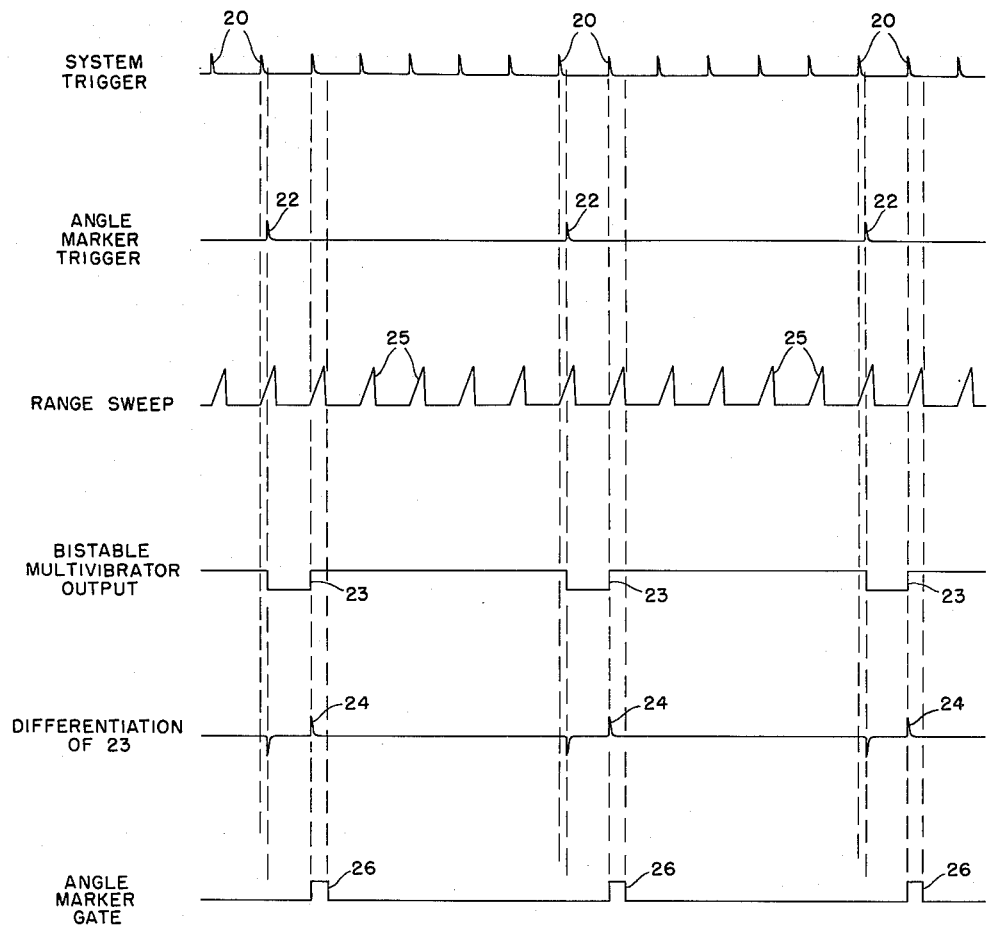

2,719,969
PRECISION ANGLE MARKER GENERATOR

Herbert H. Naidich, Baltimore, Md., assignor to Bendix Aviation Corporation, Towson, Md., a corporation of Delaware Application August 27, 1952, Serial No. 306,578

4 Claims. (Cl. 343—11)

This invention relates to a system for providing on a cathode ray tube display marks indicative of the orientation angle of an antenna or other object and more particularly to such a system which provides very precise and clean angle marks.

In radio echo distance and azimuth determining systems it is often necessary to establish a reference mark on the display at a particular angle of orientation of the antenna. This is normally accomplished by intensifying one of the range sweeping excursions of the electron beam in a P. P. I. or B type of scan so that it stands out from the remainder of the display.

The usual method of accomplishing this result has been to cause the antenna in its rotation to generate a trigger impulse by mechanical or other means. This trigger impulse is then applied directly to trigger an intensification gate which is applied to the proper electrode of the C. R. tube to intensify the sweep.

This system is satisfactory for some applications but it has limitations which render it unsatisfactory for some uses and this is particularly true at high scanning speeds. If the trigger impulse occurs after a range sweep has started only a portion of the sweep will be intensified and will provide an unsatisfactory reference mark. If the intensification gate is made to last for more than one sweep length the angle marker will be objectionably wide at high scanning speeds.

It is an object of this invention to provide an angle marker generating system which will invariably intensify one complete range sweep, and one only, to act as an angle marker.

It is another object of the invention to provide an angle marker generating system in which the width of the angle marker is independent of the speed of scan of the antenna.

These and other objects and advantages of the invention are realized by a system in which the system trigger of the radio echo system is applied to a bistable multivibrator to maintain it in one of its stable states. The trigger impulse generated by the antenna rotation is applied to the multivibrator to drive it to its remaining stable state. The next system trigger restores it to its original state, generating a negative gate which is differentiated and utilized to trigger a monostable multivibrator circuit. The latter is adjusted to provide a gate of the duration of one range sweep.

In the drawing Fig. 1 is a schematic diagram of an angle marker generator circuit embodying the invention; and Fig. 2 is a series of time related graphs of the significant voltage waveforms of the circuit of Fig. 1.

Referring more particularly to the drawing, there is shown in Fig. 1 a conventional bistable multivibrator circuit 1 comprising two triodes 2 and 3. Triode 4 is connected as a buffer amplifier having its anode connected to the anode of the tube 2. The grid of tube 4 is connected to a terminal 5, to which is applied the system trigger voltage of the radio echo system which includes an antenna 7 driven repetitively through an angular path by a motor 14 which also drives an angle marker trigger generator 17.

A triode 6 is connected as a buffer amplifier having its anode connected to the anode of the tube 3. The grid of the triode 6 is coupled to the output of trigger generator 17 from which are applied the trigger impulses generated by the rotation of the antenna.

The anode of the triode 6 is also coupled to the grid of a triode 8, by way of a differentiating circuit comprising a condenser 9 and resistor 10.

The anode of the triode 8 is connected to the anode of a triode 11, which together with a triode 12 forms a monostable multivibrator circuit 13. The output of this circuit is taken at the anode of the tube 12 and applied to the grid of the cathode ray indicator tube 18 of the radio echo system. The range sweep generator circuit 19 is triggered by the system trigger and has its output applied to the cathode ray tube deflection circuit in a known manner. The waveform of the range sweep circuit is indicated by the graph 25.

In the operation of the device the bistable multivibrator circuit 1 will normally be in a condition in which the triode 2 is conducting and the triode 3 is non-conducting. Positive system trigger impulses, as indicated by the graph 20, are applied to the amplifier 4, by way of the terminal 5. The output of the triode 4, which will be a negative going impulse, will be applied to the grid of the triode 3, maintaining the tube 3 in its non-conductive state and the tube 2 in its conductive state.

Angle marker trigger impulses, as indicated by the graph 22, are applied to the grid of triode 6. These are of positive polarity. The output of the triode 6, which will be a negative going impulse, will be applied to the grid of the triode 2, thus causing it to cease conducting and causing the bi-stable multivibrator 1 to assume its second stable state.

The multivibrator will remain in this state until the application of the next system trigger impulse, which will cause it to revert to its original state. As a result of this action, the waveform at the anode of triode 3 will be a negative going square wave as indicated by graph 23. This waveform is differentiated in the circuit 9, 10 to produce the waveform shown in graph 24. In this waveform a negative going impulse corresponds to the leading edge of the square wave 23 and a positive going impulse corresponds to the trailing edge of the waveform 23. The negative going portion of the waveform 24 will not affect the triode 8 but the positive going impulse will be inverted and applied to the control grid of the triode 12. This triode is normally in a conductive state and will be temporarily cut-off by the negative going impulse, thus producing at its anode the angle marker gate indicated by graph 26. This gate will have a duration determined by the time constant of the R. C. combination 15, 16 and this may be adjusted to provide a gate having the same duration as the range sweep.

It can be seen from the above description that the angle marker gate is not generated immediately upon the occurrence of the angle marker trigger impulse, but is initiated by the next following system trigger impulse. Since it is this impulse which initiates the range sweep, it follows that the angle marker gate will begin simultaneously with the initiation of the range sweep next following the angle marker trigger, and will terminate coincidently with the termination of the sweep, thus providing a one line indication which never varies.

What is claimed is:

1. In combination with a radio echo system having a directive antenna, means for causing the beam of said antenna to repetitively scan an angular path, means generating an angle marker voltage impulse when said beam occupies a selected position in said path, a cathode ray tube having a beam deflection circuit, a range sweep circuit connected to said deflection circuit for repetitively sweeping the beam of said cathode ray tube, means generating a series of system trigger voltage impulses and means applying said trigger impulses to said range sweep circuit to synchronize the initiation of each of said range sweeps with one of said trigger impulses: a bistable multivibrator circuit, means applying said system trigger impulses to said multivibrator circuit in a sense to drive it into one of its stable states, means applying each of said angle marker voltage impulses to said multivibrator circuit in a sense to cause it to assume the other of its stable states, whereby the one of said system trigger impulses directly following said angle marker impulses will return said multivibrator to said one state, means differentiating the output waveform of said multivibrator, a monostable multivibrator circuit having an unstable period of substantially the same duration as each of said range sweeps, means applying to said monostable multivibrator the portion of said differentiated signal corresponding in time to the one of said system trigger impulses directly following said angle marker impulse to shift said monostable multivibrator to its unstable state and means applying the output of said monostable multivibrator to said cathode ray tube in a manner to intensify the beam thereof for the duration of the unstable state of said monostable multivibrator.

2. In combination with a radio echo system having a directive antenna, means for causing the beam of said antenna to repetitively scan an angular path, means generating an angle marker voltage impulse when said beam occupies a selected position in said path, a cathode ray tube having a beam deflection circuit, a range sweep circuit connected to said deflection circuit for repetitively sweeping the beam of said cathode ray tube, means generating a series of system trigger voltage impulses and means applying said trigger impulses to said range sweep circuit to synchronize the initiation of each of said range sweeps with one of said trigger impulses: a square wave generating circuit, means applying each of said angle marker voltage impuless to said square wave circuit to initiate one of said square waves, means applying the next following one of said system trigger impulses to said square wave circuit to terminate said square wave, means for generating a gating impulse having the duration of one of said range sweeps, said gating impulse generating means being normally quiescent, means deriving a signal from said square wave coincident with the trailing edge thereof, means applying said signal to said gating impulse generating means as triggering voltage and means applying said gating impulse to said cathode ray tube in a manner to intensify the beam thereof for the duration of said gating impulse.

3. In combination with a radio echo system having a directive antenna, means for causing the beam of said antenna to repetitively scan an angular path, means generating an angle marker voltage impulse when said beam occupies a selected position in said path, a cathode ray tube having a beam deflection circuit, a range sweep circuit connected to said deflection circuit for repetitively sweeping the beam of said cathode ray tube, means generating a series of system trigger voltage impulses and means applying said trigger impulses to said range sweep circuit to synchronize the initiation of each of said range sweeps with one of said trigger impulses: means initiating a voltage waveform coincident with each of said angle marker voltage impulses, means terminating said waveform coincident with the next following one of said system trigger impulses, means for generating a gating impulse having the duration of one of said range sweeps, said gating impulse generating means being normally quiescent, means deriving a signal from the trailing edge of said waveform, means applying said signal to said gating impulse generating means as triggering voltage and means applying said gating impulse to said cathode ray tube in a manner to intensify the beam thereof for the duration of said gating impulse.

4. In combination with a radio echo system having a directive antenna, means for causing the beam of said antenna to repetitively scan an angular path, means generating an angle marker voltage impulse when said beam occupies a selected position in said path, a cathode ray tube having a beam deflection circuit, a range sweep circuit connected to said deflection circuit for repetitively sweeping the beam of said cathode ray tube, means generating a series of system trigger voltage impulses and means applying said trigger impulses to said range sweep circuit to synchronize the initiation of each of said range sweeps with one of said trigger impulses: voltage translation means having two stable output levels, means applying said trigger impulses to said translation means to drive it to and maintain it at a first of said levels, means applying each of said angle marker voltage impulses to said translation means to shift it to the second of said levels, means for generating a gating impulse having the duration of one of said range sweeps, said gating means being normally quiescent, means deriving a signal coincident with the shift of said translation means from said second of said levels to said first, means applying said signal to said gating impulse generating means as triggering voltage and means applying said gating impulse to said cathode ray tube in a manner to intensify the beam thereof for the duration of said gating impulse.

References Cited in the file of this patent

UNITED STATES PATENTS

| | | |
|---|---|---|
| 2,564,006 | Haworth | Aug. 14, 1951 |
| 2,603,778 | McVay | July 15, 1952 |